(12) United States Patent
Smith et al.

(10) Patent No.: US 12,339,766 B2
(45) Date of Patent: Jun. 24, 2025

(54) INTEGRATED DEVELOPMENT ENVIRONMENT FOR PROTOCOL DESIGN, EVALUATION AND DEBUGGING

(71) Applicant: Tektronix, Inc., Beaverton, OR (US)

(72) Inventors: Mark Anderson Smith, Portland, OR (US); Michael Scott Silliman, Portland, OR (US); Andrew Loofburrow, Tigard, OR (US); Eric T. Anderson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 16/980,375

(22) PCT Filed: Mar. 13, 2019

(86) PCT No.: PCT/US2019/022038
§ 371 (c)(1),
(2) Date: Sep. 11, 2020

(87) PCT Pub. No.: WO2019/178219
PCT Pub. Date: Sep. 19, 2019

(65) Prior Publication Data
US 2021/0042212 A1    Feb. 11, 2021

Related U.S. Application Data

(60) Provisional application No. 62/642,011, filed on Mar. 13, 2018.

(51) Int. Cl.
*G06F 11/3698* (2025.01)
*G06F 8/60* (2018.01)

(52) U.S. Cl.
CPC ............ *G06F 11/3698* (2025.01); *G06F 8/60* (2013.01)

(58) Field of Classification Search
CPC .............................. G06F 8/60; G06F 11/3664
See application file for complete search history.

(56) References Cited

U.S. PATENT DOCUMENTS

| 5,489,158 | A  | * | 2/1996 | Wang | G06K 19/06046 |
|---|---|---|---|---|---|
|  |  |  |  |  | 346/74.2 |
| 7,509,250 | B2 | * | 3/2009 | Cruzado | H04L 9/065 |
|  |  |  |  |  | 380/43 |

(Continued)

FOREIGN PATENT DOCUMENTS

| CN | 107302716 B | * | 3/2019 | ......... H04N 21/4314 |
|---|---|---|---|---|
| CN | 107959525 B | * | 9/2020 | ............... H04B 1/16 |

(Continued)

OTHER PUBLICATIONS

Sarikaya et al., "A Test Design Methodology for Protocol Testing", May 1987, IEEE, vol. SE-13, No. 5 (Year: 1987).*

(Continued)

*Primary Examiner* — Wei Y Zhen
*Assistant Examiner* — Junchun Wu
(74) *Attorney, Agent, or Firm* — Miller Nash LLP; Andrew J. Harrington

(57) ABSTRACT

A protocol designer for a test and measurement instrument, comprising an input to receive a signal, a memory configured to store the signal, an author configured to generate protocol definitions based on a user input, a debugger configured to output textual and visual decode results based on the protocol definitions and the signal, and a deployer configured to output a compiled protocol definition file to the test and measurement instrument.

17 Claims, 11 Drawing Sheets

(56) References Cited

U.S. PATENT DOCUMENTS

| | | | |
|---|---|---|---|
| 8,356,282 B1* | 1/2013 | Leippe | G06F 11/3684 |
| | | | 717/130 |
| 8,452,567 B1* | 5/2013 | Sullivan | G06F 11/3698 |
| | | | 702/122 |
| 9,940,220 B2 | 4/2018 | Romm et al. | |
| 9,959,186 B2 | 5/2018 | Hutner et al. | |
| 2003/0066018 A1* | 4/2003 | Yu | H04L 1/0051 |
| | | | 714/792 |
| 2005/0204256 A1* | 9/2005 | Yeh | H03M 13/3994 |
| | | | 714/755 |
| 2007/0030812 A1* | 2/2007 | MacDonald | H04L 69/03 |
| | | | 370/241 |
| 2007/0044158 A1* | 2/2007 | Cruzado | G01R 31/318555 |
| | | | 726/27 |
| 2007/0071009 A1* | 3/2007 | Nagaraj | H04L 1/0057 |
| | | | 714/48 |
| 2008/0144656 A1* | 6/2008 | Frishberg | H04L 43/18 |
| | | | 370/466 |
| 2009/0113178 A1* | 4/2009 | Kim | G06F 9/30003 |
| | | | 712/205 |
| 2009/0240351 A1 | 9/2009 | Leong et al. | |
| 2013/0080832 A1* | 3/2013 | Dean | G16H 40/40 |
| | | | 714/E11.178 |
| 2013/0125006 A1 | 5/2013 | Rule et al. | |
| 2016/0189331 A1* | 6/2016 | Costa | G06F 3/0416 |
| | | | 345/173 |
| 2016/0350173 A1 | 12/2016 | Ahad | |
| 2017/0155440 A1* | 6/2017 | Sun | H04L 1/203 |
| 2017/0277664 A1 | 9/2017 | Mihalcea et al. | |
| 2017/0315902 A1* | 11/2017 | Moretto | G06F 11/3688 |
| 2018/0140271 A1* | 5/2018 | Raman | A61B 6/02 |
| 2018/0165150 A1* | 6/2018 | Fainzilber | G06F 11/1016 |
| 2018/0307584 A1* | 10/2018 | Smith | G06F 8/427 |
| 2021/0042212 A1* | 2/2021 | Smith | H04L 43/50 |

FOREIGN PATENT DOCUMENTS

| | | | |
|---|---|---|---|
| EP | 1421482 | 5/2004 | |
| EP | 1562131 | 4/2013 | |
| JP | 2010267266 | 11/2010 | |
| JP | 2013106356 | 5/2013 | |
| JP | 2018518762 | 2/2019 | |
| WO | 2014026600 | 2/2014 | |
| WO | WO-2019178219 A1 * | 9/2019 | G06F 11/3664 |

OTHER PUBLICATIONS

Milor et al., "A Tutorial Introduction to Research on Analog and Mixed-Signal Circuit Testing", Oct. 1998, IEEE, vol. 45, No. 10 (Year: 1998).*

Carzaniga et al., "Design and Evaluation of a Wide-Area Event Notification Service", 2001, ACM (Year: 2001).*

Swets, "Measuring the Accuracy of Diagnostic Systems", Jun. 1988, American Association for the Advancement of Science (Year: 1988).*

Nick Papoylias, High-Level Debugging Facilities and Interfaces: Design and Development of a Debug-Oriented I.D.E., Open Source Software: New Horizons, OSS 2010, IFIP Advances in Information and Communication Technology, pp. 373-379, vol. 319, Springer, Berlin, Heidelberg.

International Search Report and Written Opinion of the International Searching Authority issued in International Application No. PCT/US2019/022038, mailed May 23, 2019.

Tomohiko Higashi, Communication protocol design using CMDL, a protocol specification description language, that enables everything from specification description to automatic code generation, Interface, Feb. 2004, vol. 30 No. 2, CQ Publishing Co., Ltd.

* cited by examiner

```
Start | Waveform 3 | I2c.eddl  X 16
17    int WRITE = 0;
18    int READ = 1;
19
20    event S = fall(data) when clock == 1;
21    event P = rise(data) when clock == 1;
22    cevent Sr = peek S;
23
24    packetSection
25    {
26        // Start Byte
27        packet StartByte = S
28        {
29            (A.Start#Required:8) == 00000001b,
30            A.Ack:1
31        }Sr;
32
33    //Write10 – A master-transmitter addresses a slave-receiver with a 10-bit address
34    packet Write10Master_wStop = "Write10Master":
      {
```

302

202 syntax error, unexpected IDENT (line.col:33.56)

300

204

Compile Output | Decode Output | Bitstream Output

Fig. 3

INTEGRATED DEVELOPMENT ENVIRONMENT FOR PROTOCOL DESIGN, EVALUATION AND DEBUGGING

PRIORITY

This disclosure claims benefit of U.S. Provisional Application No. 62/642,011, titled "INTEGRATED DEVELOPMENT ENVIRONMENT FOR PROTOCOL DESIGN, EVALUATION, AND DEBUGGING," filed on Mar. 13, 2018, which is incorporated herein by reference in its entirety.

FIELD OF THE INVENTION

This disclosure is directed to systems and methods related to test and measurement systems, and in particular, to authoring, debugging, and deploying protocol definitions for a test and measurement instrument.

BACKGROUND

In electronic communication systems, information is typically transmitted according to certain protocols in the form of packets. Protocol stacks are made up of different protocols in a layered configuration. For example, the first layer may be a physical layer that encompasses the transmission of unstructured bit streams—the waveform. The second layer may be a data link layer that assures error free transmission. The third layer may be a network layer for addressing and control. The fourth layer may be a transport layer for transport of the data. The fifth layer may be a session layer for establishing, managing and terminating connections. And finally, the sixth layer may be a presentation layer for meaningful exchange of data—including encryption, compression, and reformatting of data. Information is transmitted as an analog signal representing sequences of 1s and 0s at the physical layer. The analog data can then be converted into a digital equivalent and decoded according to a defined protocol.

Currently, the conventional protocol designer only provides options for authoring and/or creating protocol definition files and verifying the language correctness of the protocol using a complier. However, the conventional protocol designer for test and measurement instruments does not provide assistance debugging decode results, or provide information about a physical layer interpretation of an analog serial bus source.

Embodiments of the disclosure address these and other deficiencies of the prior art.

BRIEF DESCRIPTION OF THE DRAWINGS

Aspects, features and advantages of embodiments of the present disclosure will become apparent from the following description of embodiments in reference to the appended drawings in which:

FIG. 3 illustrates an example of a portion of the GUI of FIG. 2 for debugging protocol definitions using a compiler.

DESCRIPTION

As discussed above, current tools for authoring protocol definitions provide options only for creating protocol definitions and verifying the language correctness of the protocol definitions. However, current tools do not allow for any further textual and/or visual debugging of the created protocol definitions, such as confirming the protocol definitions are correctly detecting packets and data within a signal. That is, existing protocol definition tools do not help with debugging decode results nor do they provide information about a physical layer interpretation of an analog serial bus source.

Embodiments of the disclosure, on the other hand, provide additional information, both graphically and textually, to help a user identify possible problems with a protocol definition. For example, embodiments of the disclosure may include a physical layer bit stream output, decoder debug output, timing information, and visual representation of time-correlated input source and decode results to allow a user to interactively debug their protocol definitions. Further, embodiments of the disclosure, as discussed in further detail below, provide a complete development environment from authoring to debugging to deployment.

Figure 1:
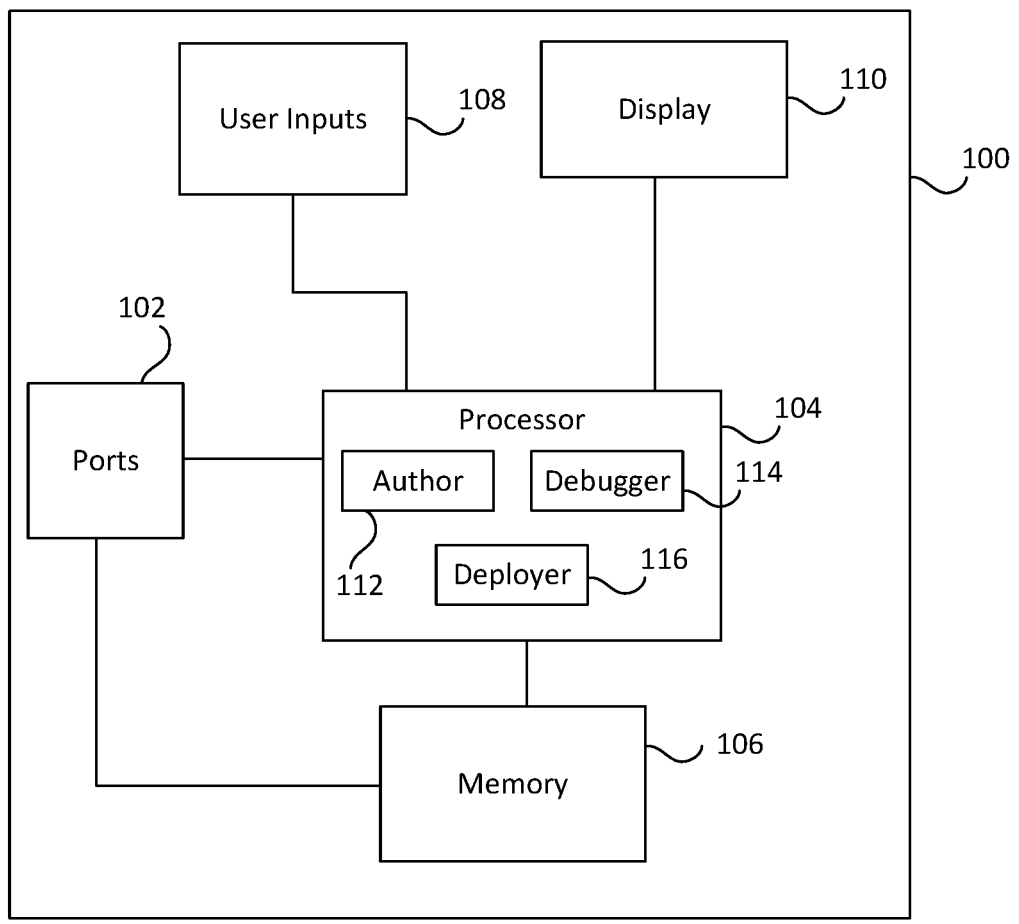
FIG. 1 is a block diagram of an example protocol designer according to embodiments of the disclosure.

FIG. 1 is a block diagram of an example protocol designer 100, for implementing embodiments of the disclosure disclosed herein. The protocol designer 100 may be, for example, an integrated design environment. The protocol designer 100 includes one or more ports 102. Ports 102 may include any device to receive data, either wired or wirelessly. Ports 102 are connected to a processor 104, which includes various components for implementing embodiments of the disclosure, as discussed in more detail below. Although only one processor 104 is shown in FIG. 1 for ease of illustration, as will be understood by one skilled in the art, multiple processors 104 of varying types may be used in combination, rather than a single processor 104.

The ports 102 can also be connected to a memory 106 to store data received through the ports 102. Memory 106 may also store instructions for execution by the one or more processors 104, such as to perform any methods, operations, and/or associated steps indicated by such instructions. For example, memory 106 may include instructions for authoring protocols and debugging protocols, including visually displaying results of the protocol definitions against a known analog signal. As will be understood by one of ordinary skill in the art, memory 106 may include one or more memories, such as, but not limited to, processor cache, random access memory (RAM), read only memory (ROM), solid state memory, hard disk drive(s), or any other memory type.

User inputs 108 are coupled to the one or more processors 104. User inputs 108 may include a keyboard, mouse, trackball, touchscreen, and/or any other controls employable by a user to interact with a graphical user interface (GUI) on a display 110. The display 110 may be a digital screen, a cathode ray tube based display, or any other monitor to display waveforms, measurements, and other data to a user. While the components of the protocol designer 100 are depicted as being integrated within protocol designer 100, it will be appreciated by a person of ordinary skill in the art that any of these components can be external to protocol designer 100 and can be coupled to the protocol designer 100 in any conventional manner (e.g., wired and/or wireless communication media and/or mechanisms). For example, in some embodiments, the display 110 may be remote from the protocol designer 100.

Returning to the processor 104, the processor 104 may include an author 112. The author 112 can be configured to allow a user to create and/or edit protocol definition files, such as taught by U.S. Patent Publication No. 2007/0030812 A1, which is incorporated by reference herein in its entirety. The processor 104 can also include a debugger 114. The debugger 114, as will be discussed in more detail below, provides options for debugging of the protocol definitions and refinement of the decode results through multiple textual and visualization schemes. The processor 104 may also include a deployer 116 to deploy, or output and transfer, the protocol definition files to a test and measurement instrument, such as an oscilloscope, logic analyzer, etc. The processor 104 also includes a runtime engine. In some embodiments, the runtime engine is provided as a portion of the debugger 114. The runtime engine, which may be called a declarative decode language (DDL) runtime engine, generates the decode results based on the protocol definitions and a received signal from the ports 102 and/or a signal saved in memory 106.

Figure 2:
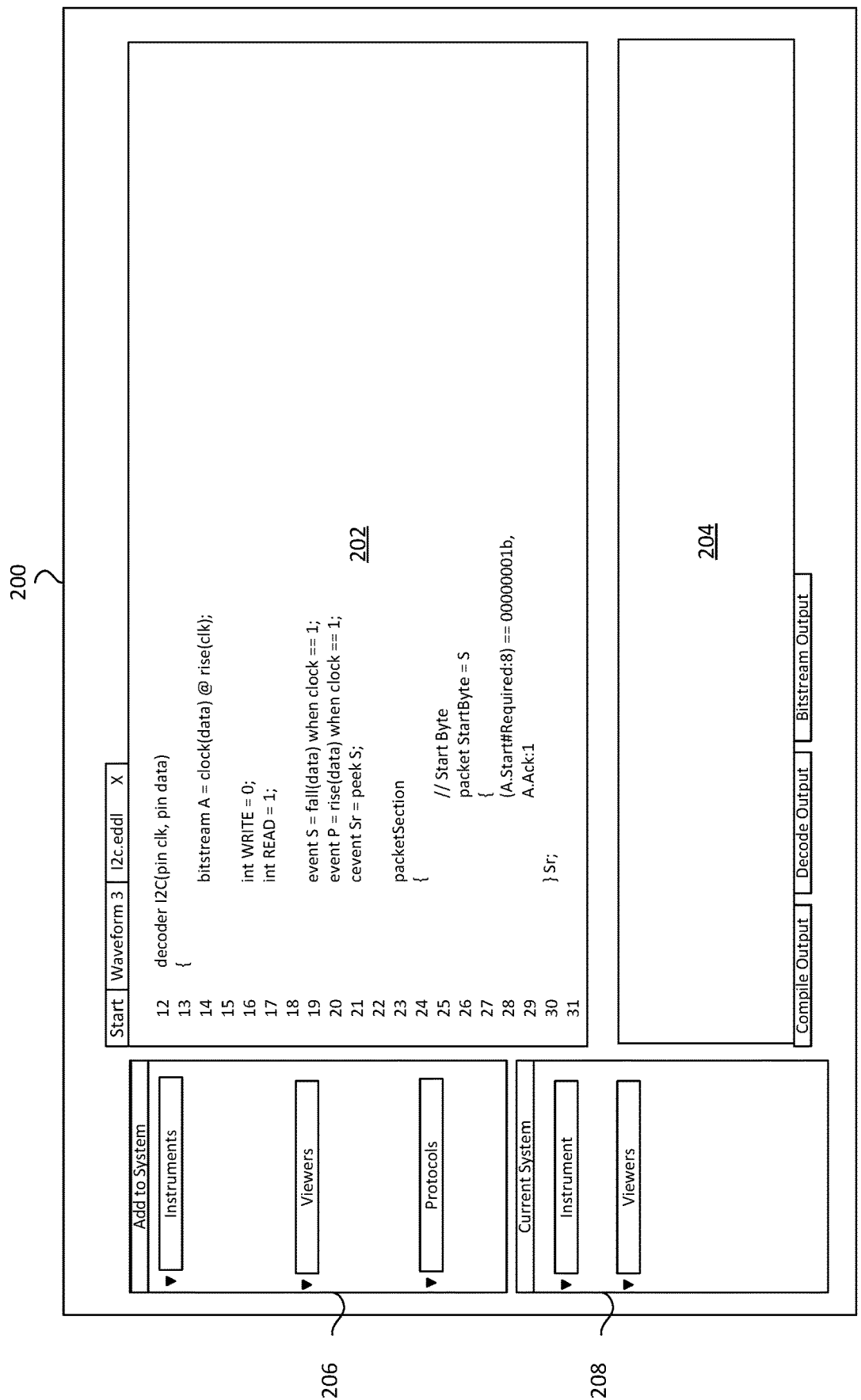
FIG. 2 is an example graphical user interface (GUI) of the protocol designer of FIG. 1.

FIG. 2 illustrates an example of a graphical user interface output on the display 112 for a protocol designer 100. The graphical user interface 200 can include various windows 202 to display different information, such as a received waveform or a protocol editor. The graphical user interface 200 can include various menus to allow a user to select a type of instrument for deployment, viewers, saved protocols, etc. This graphical user interface 200 may be used, as mentioned above to author, debug, and deploy protocol definition files through the author 112, the debugger 114, and the deployer 116.

The graphical user interface 200 includes a window 204 for displaying various decode outputs from the debugger 114. The graphical user interface 200 further includes various menus 206 and 208 to view what is in the current system and what instruments, viewers, and protocols may be added to the system.

FIG. 3 illustrates an example of one of the features of the debugger 114. FIG. 3 shows a portion of the graphical user interface 200. After a protocol definition is written in a domain-specific language using the author 112, the debugger 114 runs the protocol definitions through a compiler. The compiler output may be displayed in window 204 for a user to analyze. The compiler identifies protocol definition syntax errors, such as undeclared identifiers, along with their locations in the protocol definition file, for example by giving the line and column number of the error in the protocol definition source code.

To aid in the quick identification of source code errors, the debugger 114 can highlight or otherwise identify the compiler-generated error in the window 204. When the compiler-generated error is selected by a user, the debugger 114 can bring the corresponding source file into view in the window 202 with the offending error highlighted 302. For example, as seen in FIG. 3, a syntax error is identified 300 in the window 204 and the error in the protocol definition is highlighted 302 so a user can quickly determine where the error exists and correct the error.

Figure 4:
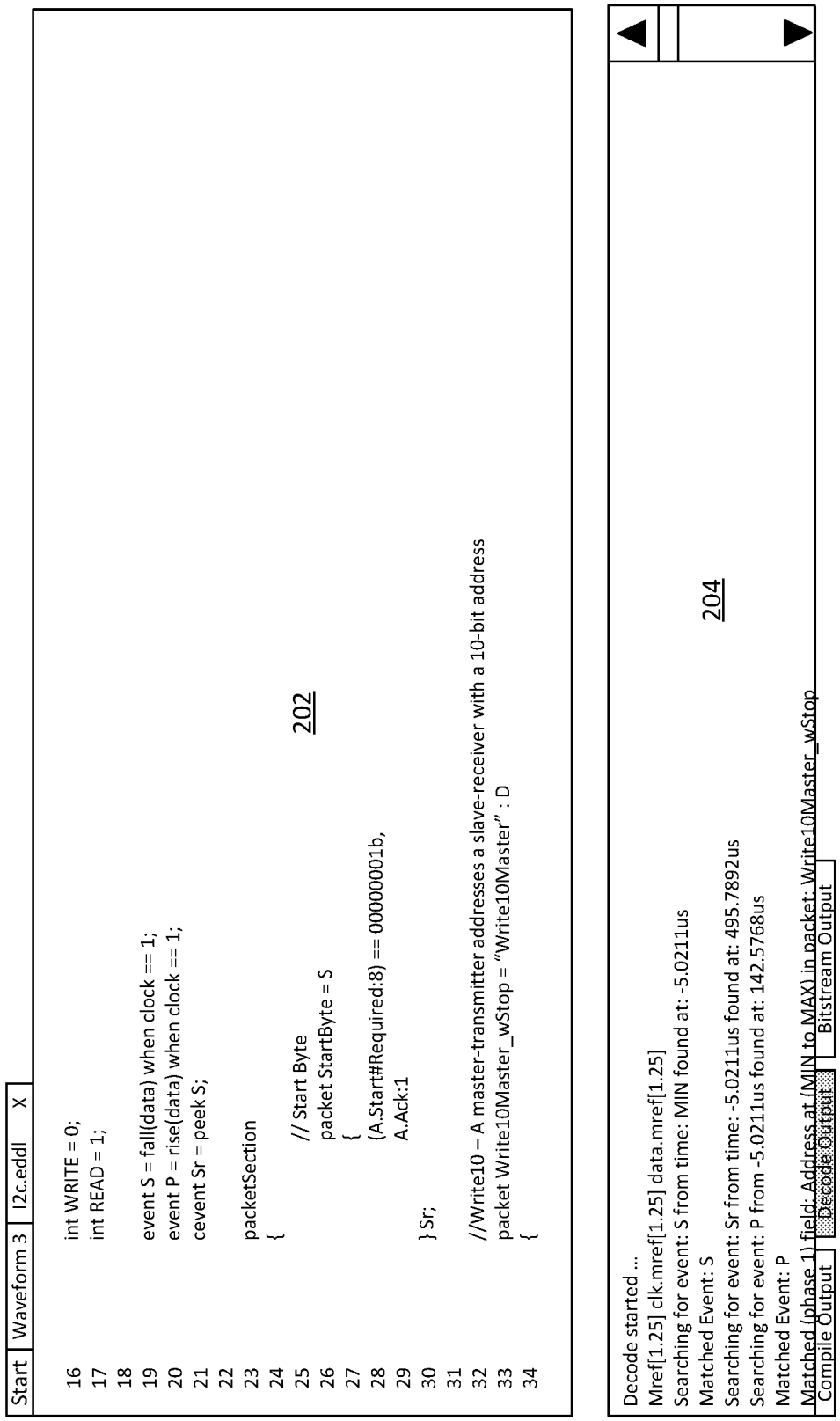
FIG. 4 illustrates an example of a portion of the GUI of FIG. 2 for debugging protocol definitions using a decode output.

FIG. 4 illustrates yet another feature of the debugger 114. A runtime engine of the debugger 114, which may be operated by one or more of the processors 104, can generate debug output data that indicates event and field matches of the protocol definitions along with timing information of the matches. As mentioned above, known data can be supplied through the one or more ports 102 to the memory 106.

As seen in FIG. 4, the decode output window 204 may include data that indicates the event and field matches of the known signal, with the timing information. A user may then compare this data to the known input data to determine if the protocol definitions are functioning properly or as expected. That is, that the protocol definitions are correctly identifying the field and event points in the known input data. A user can further augment these debug outputs by inserting optional OUTPUT commands within the protocol definitions.

Figure 5:
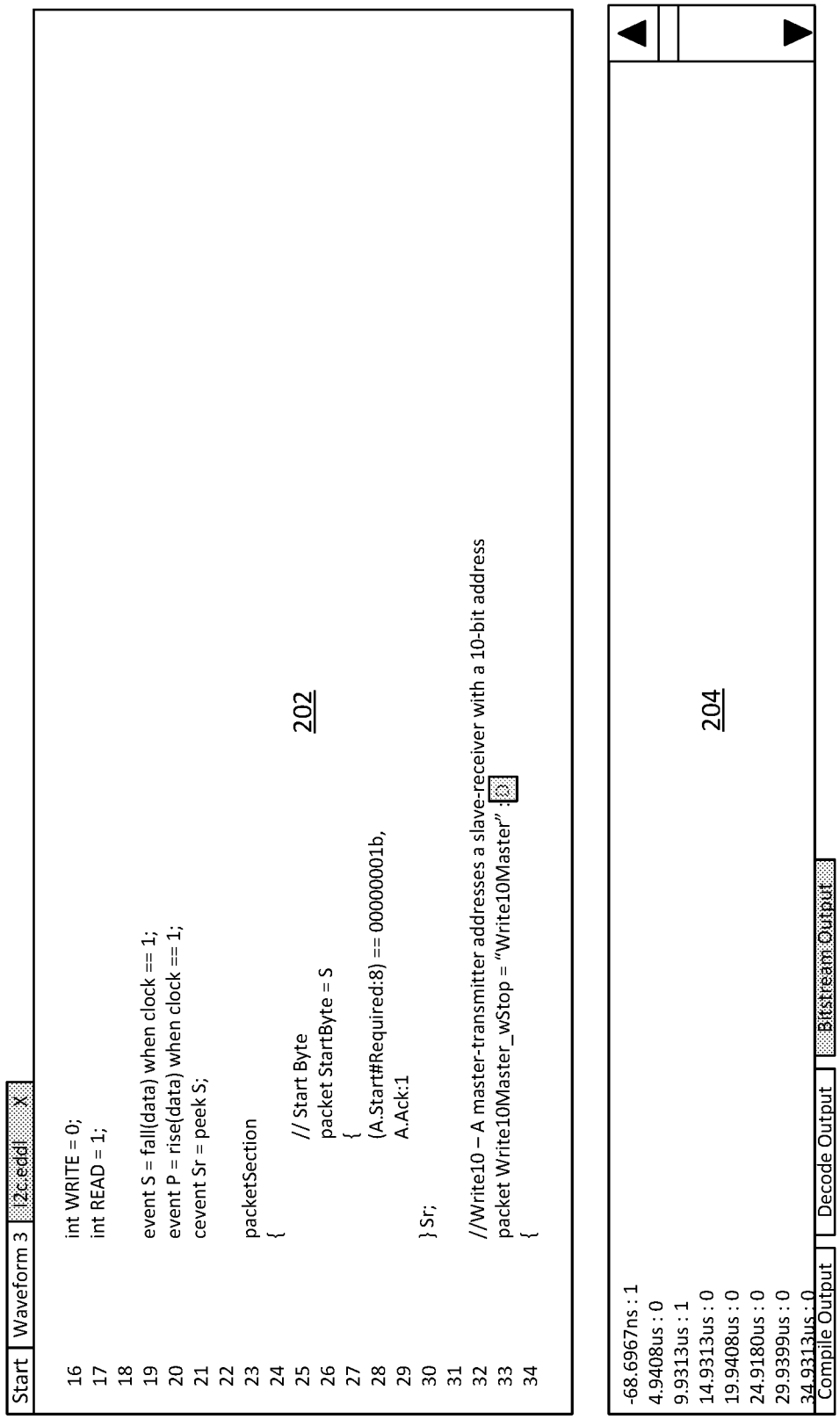
FIG. 5 illustrates an example of a portion of the GUI of FIG. 2 for debugging protocol definitions using a bitstream output.

The debugger 114 may also enable output of both a decode operation, as well as the underlying physical layer bitstream conversion. The bitstream information is the conversion of raw analog input signals into a serial sequence of digital bits by means of clocked signals, clock recovery, and other encoding mechanisms. FIG. 5 illustrates the bitstream output in window 204, which outputs the serial sequence of digital bits, along with timing information, for the user to compare to the known input signal. This may allow a user to ensure that the bitstream conversion using an authored protocol definition is yielding the expected sequence of bits. Invalid bit sequences can indicate timing errors in the input signals or point to algorithm errors in the bitstream conversion definitions in the protocol definitions.

In the window 204 of FIG. 5, the bitstream debugger 114 output shows the timing of the source conversion to bits. In some embodiments, the protocol designer 100 may include, by default, a library of protocol definitions to support a variety of commonly-used physical layer encoding schemes. The stock protocol definitions library may be stored in the memory 106, for example. The protocol definition library may support physical layer encoding schemes such as, but not limited to, non-return to zero (NRZ), Manchester, multi-level transmit 3 (mlt3), as well as custom definitions. This may be especially useful for users that have created their own physical layer definition using a domain-specific language rather than re-using one of the stock physical layer definitions.

Protocol event definitions can be the primary means for identifying the beginning and end of packets. As a result, tools for identifying proper event definition and timing characteristics are important for the protocol definitions. As such, the debugger 114 can provide a feature where the runtime decode processing stops when an event of interest is detected, and the event may be output to the user and the time it occurred. For instance, a user may want to set a breakpoint on event S to see where this event is first detected in the input data. In some embodiments, the debugger 114 may search for all events in the input data. Rather than halting on runtime, the debugger 114 can provide a static evaluation on how the runtime engine interprets events throughout the data record by finding each event specified by a user.

Figure 6:
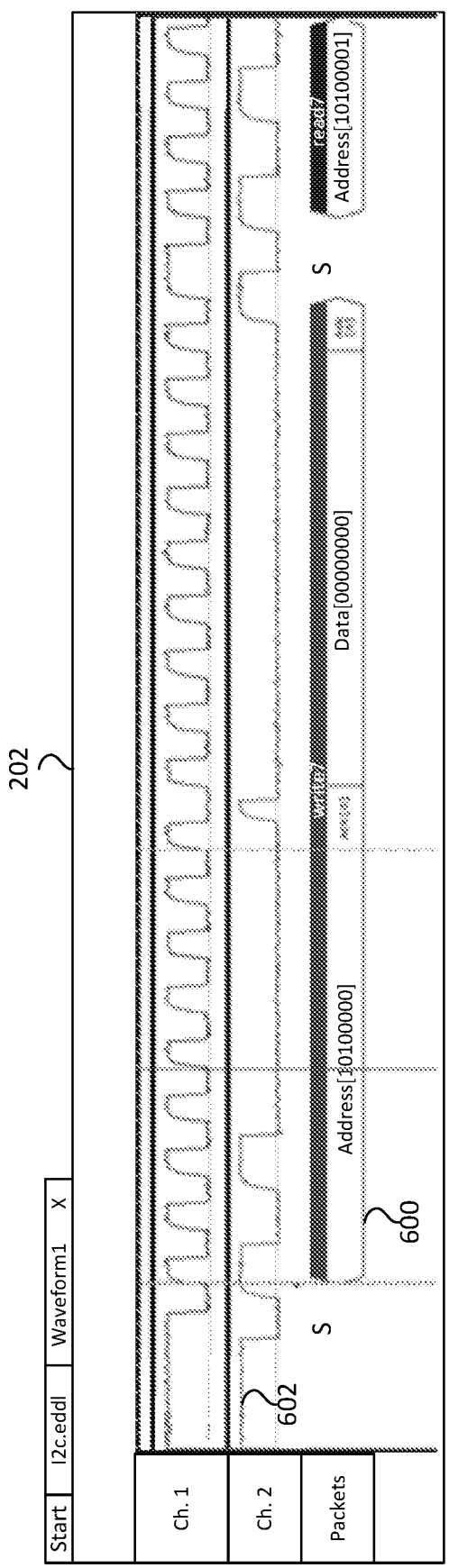
FIG. 6 illustrates a visual alignment of matched events and the source data.

In some embodiments, as illustrated in FIG. 6, the debugger 114 can utilize window 202 to annotate the input data with matched events. For example, the event S packet 600 is matched and identified with the input data 602. In the example shown in FIG. 6, the waveforms labeled "Ch. 1" and "Ch. 2" may be, respectively, the clock signal and the data signal of a serial communications bus. This can allow a user the ability to visually align the runtime evaluation of events against the known data input to confirm that the protocol definitions are working as expected and there is no error in the protocol definitions.

Figure 7:
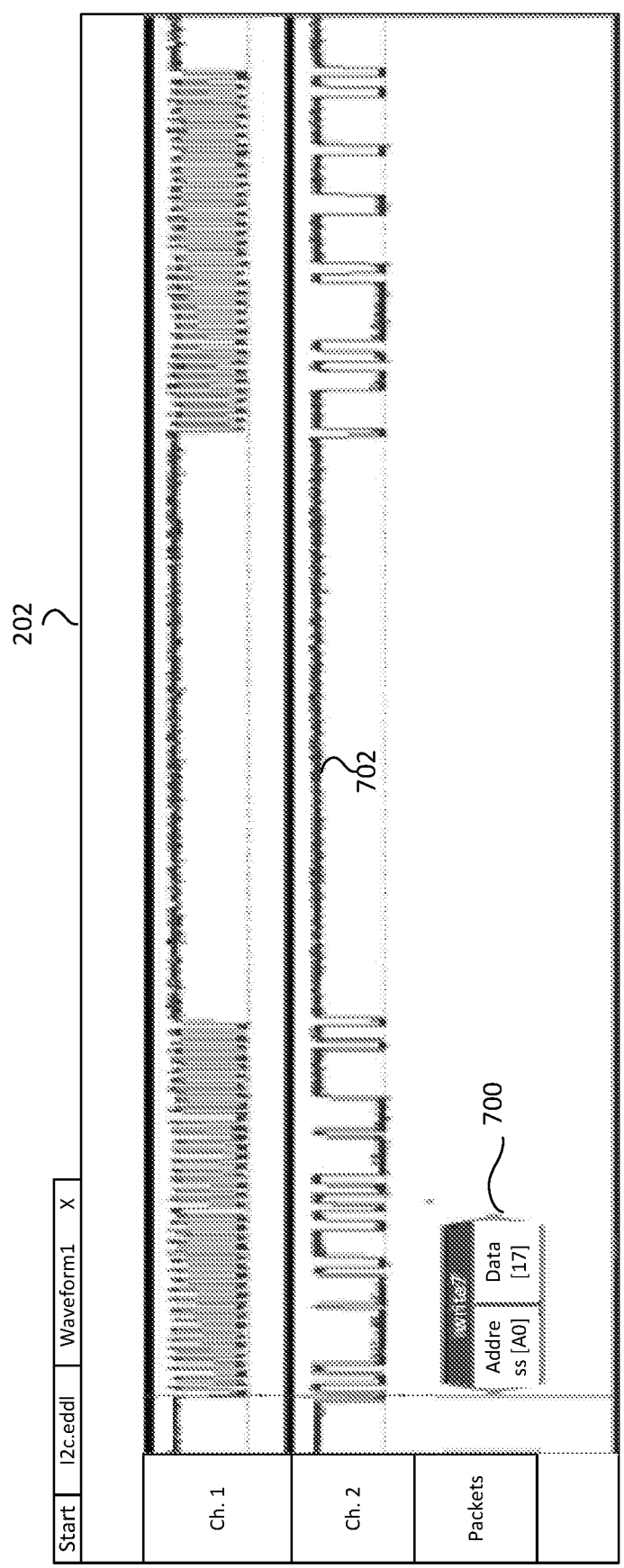
FIGS. 7-9 illustrate visually stepping through matched events in the source data.
Figure 8:
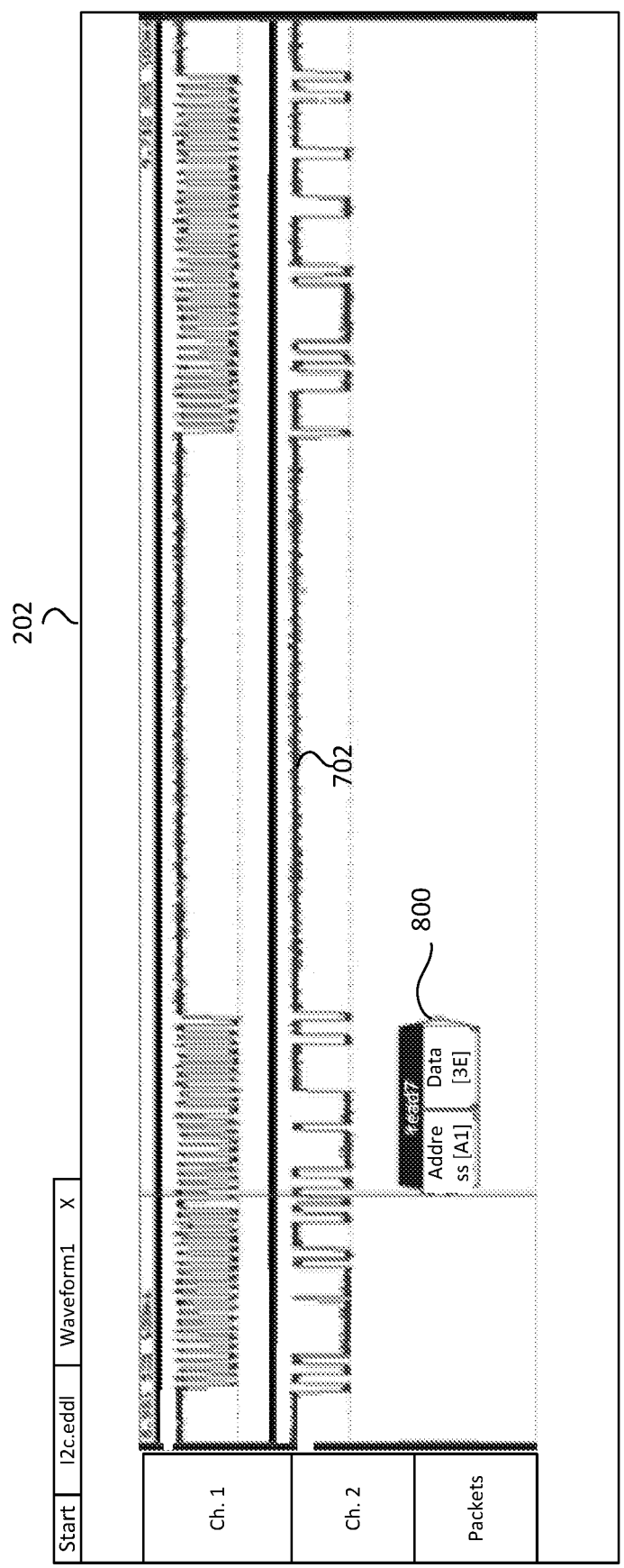
Figure 9:
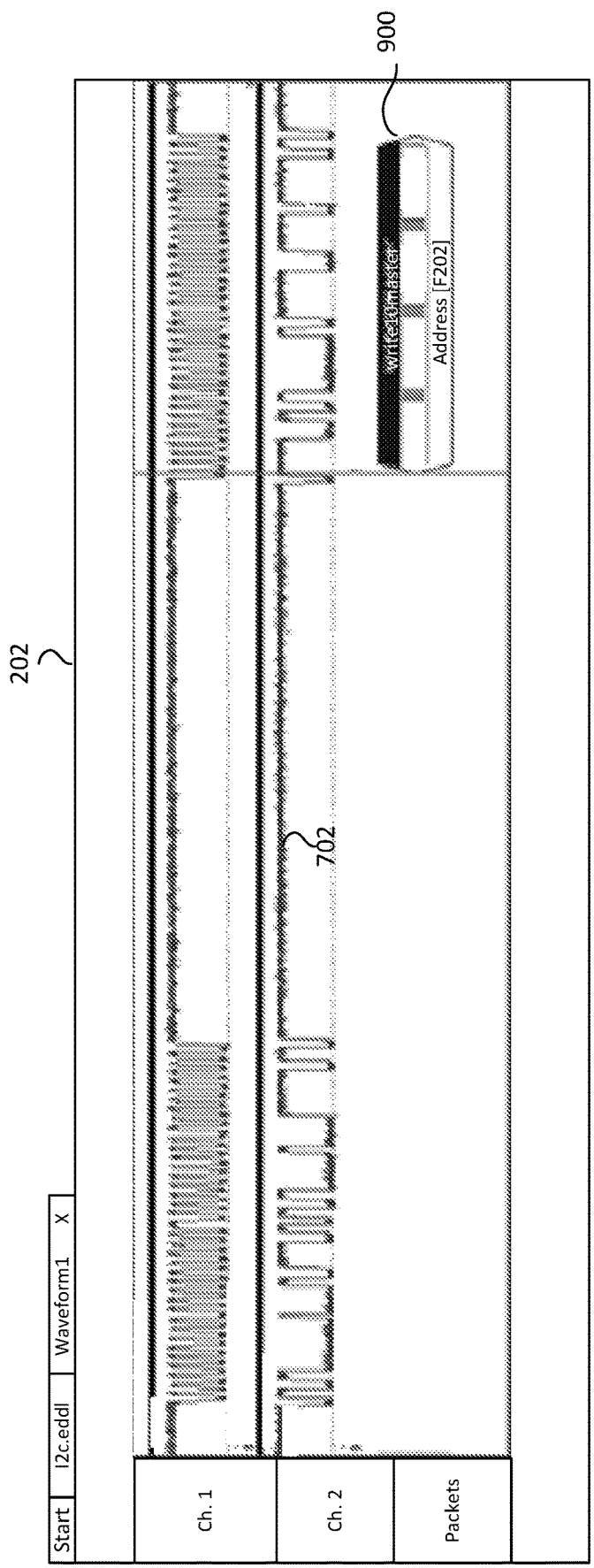

Debugger 114 can also allow a user to step through packet detection and decode results, as shown in FIGS. 7-9. Debugger 114 can allow a user to sequence through an input waveform and identify how the runtime engine is interpreting each packet sequence. As seen in FIG. 7, a first packet 700 is displayed in window 202 relevant to the input waveform 702. A cursor is displayed to align the input waveform and the start of the decoded packet 700, thereby showing a time-correlated view between a decoded packet and an input waveform. In FIG. 8, the cursor along the input waveform 702 has been moved by a user and the new packet 800 at that point in the input waveform is shown. A user can continue to scroll through the input waveform and the next packet 900 will display, as shown in FIG. 9, when entered into the waveform.

In some embodiments, a user may select a button to step through each packet detection. When the button is first pressed, a packet 700 and a cursor on the input waveform at the first packet 700 will be displayed. When the button is pressed again, the next packet 800 will be displayed, and the cursor will move on the input waveform to the location of the next packet 800. This continues until the end of the input waveform.

Further, in some embodiments, a user may select a "decode from" option in the debugger 114 to select an arbitrary time within the waveform view, and the runtime decoder or engine will begin decode evaluation from this time forward. This can provide a faster analysis and debug time when dealing with protocol specifications that encode multiple packet begin events.

Figure 10:
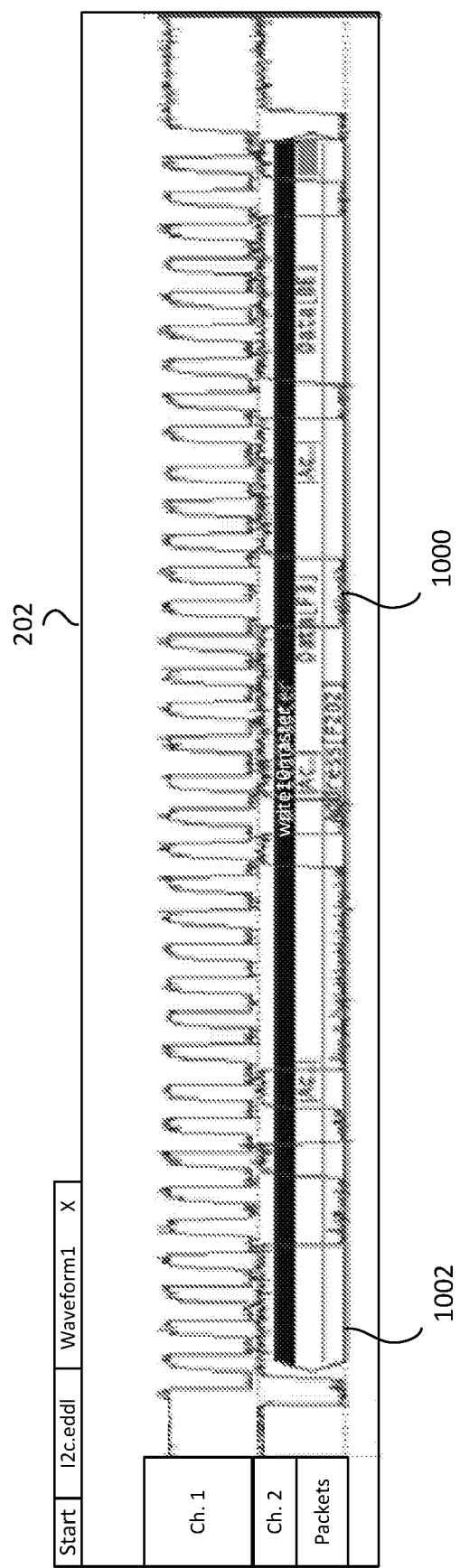
FIG. 10 is an example of concurrently displaying the input data and the decode results.

The debugger 114 may also include an overlay option. When this option is selected by a user, the debugger 114 provides the ability to view the input data 1000 and the decode results 1002 as overlaid views, as illustrated in FIG. 10. The overlaid views may be superimposed directly on top of each other, or adjusted so that each of the sources are slightly offset in the vertical direction. That is, the overlaid views of the input data 1000 and the decode results 1002 do not have to be fully overlaid, but may be offset from each other. As can be seen in FIG. 10, this can enhance the ability of the user to see how input signals and their timing are being interpreted by the runtime engine using the protocol definitions. A user can use this information to then modify their protocol definitions, as needed, to get a desired result.

The debugger 114 may also include additional features to aid in the definition and evaluation of decode results, such as cursors and marks for locating points of interest, tools for measuring time differences between cursors, search/filter options to locate decoded results quickly, along with different display radix options.

Figure 11:
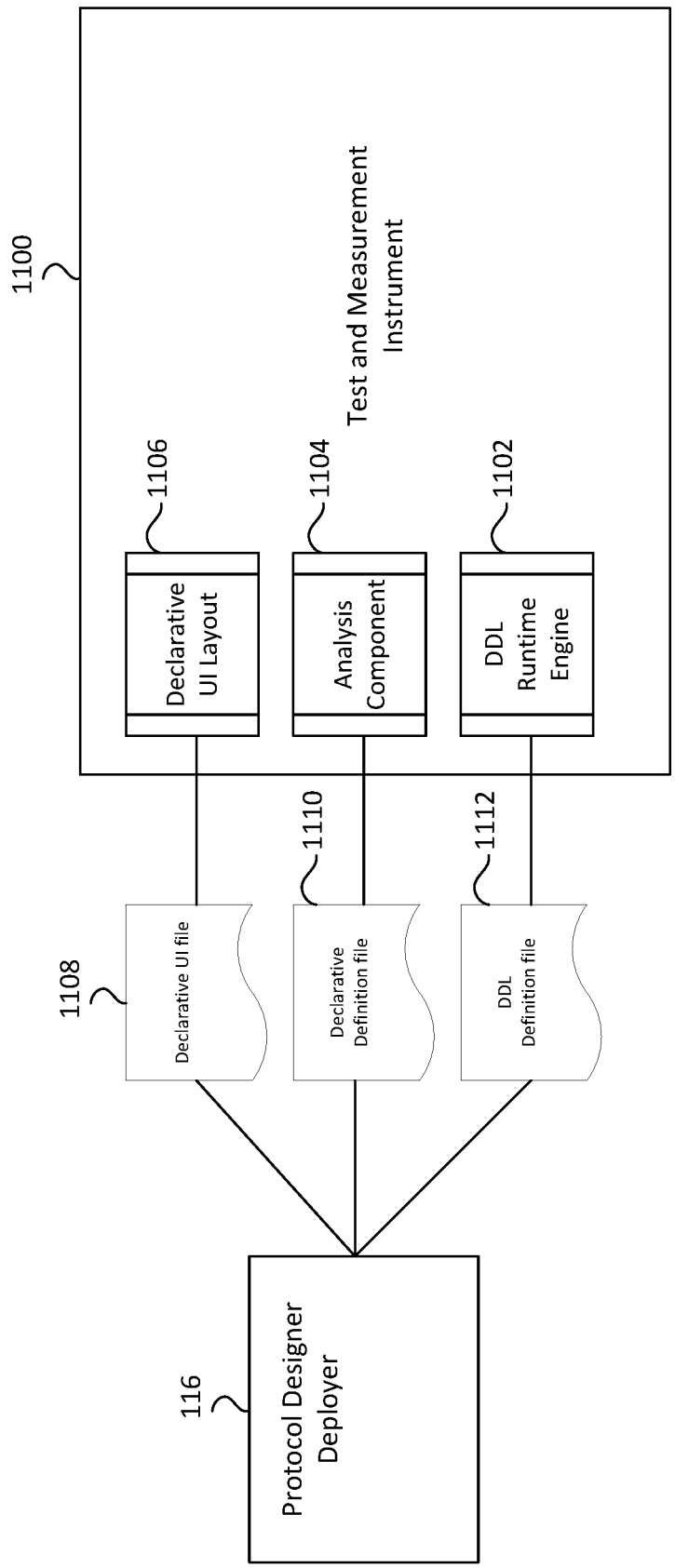
FIG. 11 is a block diagram illustrating the deployer of the protocol designer transmitting information to a test and measurement instrument.

As discussed above, the protocol designer 100 may also include a deployer 116. Once a user has generated the complete protocol definition, using the author 112 and/or the debugger 114, the deployer 116 can transmit the protocol definitions to a test and measurement instrument 1100, as shown in FIG. 11. That is, the protocol designer 100 allows a user to create and completely debug a complete protocol solution which may then run within a test and measurement instrument 1100 without modifications to the test and measurement instrument 1100 core firmware. The test and measurement instrument 1100 may include the same runtime engine that is included in the protocol designer 100. In other words, embodiments of the disclosed technology enable the test and measurement instrument 1100 to provide decode and/or event search support for an entirely new or proprietary protocol, without any modifications to the core code base of the test and measurement instrument 1100. Since the code base of the test and measurement instrument 1100 is typically quite complex, modification and requisite testing of the code base is generally time-consuming, expensive, and prone to error. Thus, embodiments of the disclosed technology significantly improve the time-to-market and cost of supporting new and/or custom protocols.

A test and measurement instrument 1100 may include the same description definition language (DDL) runtime engine 1102 as the protocol designer 100. The test and measurement instrument 1100 may also include an analysis component 1104 for analyzing any incoming signals to the test and measurement instrument 1100, as well as a declarative user interface layout 1106.

The deployer 116 of the protocol designer 100 can generate and transmit a declarative user interface file 1108, which includes a configurations and/or settings menu for the protocol decode options. In some embodiments, the declarative user interface file 1108 may use the Qt Modeling Language (QML). The deployer 116 can also generate and transmit an declarative definition file 1110 that defines the query language, protocol display properties, and search definitions. In some embodiments, the declarative definition file 1110 may use the eXtensible Markup Language (XML). The deployer 116 may also output the compiled protocol definition file 1112, or the DDL definition file to be run by the DDL runtime engine 1102.

As mentioned above, embodiments of the disclosure are advantageous by allowing a protocol designer to not only author protocol definitions, but also debug and deploy the protocol definitions to a test and measurement instrument. This can allow a user to ensure their generated protocol definitions are behaving as expected, to analyze data later on a test and measurement instrument to ensure tested devices are performing as expected. Previous protocol designers and integrated design environments for protocol definitions have only allowed a user to generate the protocol definitions, but not perform the extensive debugging of the protocol definitions as can be done using embodiments of the disclosure.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

Example 1 a protocol designer for a test and measurement instrument, comprising: an input to receive a signal; a memory configured to store the signal; an author configured to generate protocol definitions based on a user input; a debugger configured to output textual and visual decode results based on the protocol definitions and the signal; and a deployer configured to output a complied protocol definition file to the test and measurement instrument.

Example 2 is the protocol designer of example 1, in which the debugger is further configured to generate event and field matches with timing information in the signal based on the protocol definitions.

Example 3 is the protocol designer of either one of examples 1 or 2, in which the signal is an analog signal and the debugger is further configured to generate a bitstream based on the analog signal and one or more of the protocol definitions.

Example 4 is the protocol designer of any one of examples 1-3, in which the debugger is further configured to halt decoding of the signal when an event is detected.

Example 5 is the protocol designer of any one of examples 1-4, in which the debugger is further configured to decode the input signal based on the protocol definitions and search for a particular event within the decoded input signal.

Example 6 is the protocol designer of any one of examples 1-6, in which the debugger outputs event packets based on the protocol definitions, and the protocol designer further comprises a display configured to display at least a portion of the event packets and the input signal concurrently.

Example 7 is the protocol designer of example 6, in which the display is further configured to display the at least a portion of event packets overlaid on the input signal.

Example 8 is the protocol designer of any one of examples 1-7, in which the debugger is further configured to identify and highlight syntax errors within the protocol definitions.

Example 9 is one or more computer-readable storage media comprising instructions, which, when executed by one or more processors of a protocol designer, cause the protocol designer to: receive a signal; store the signal; generate protocol definitions based on a user input; output textual and visual decode results based on the protocol definitions and the signal; generate a compiled protocol definition filed based on the user input; and output the complied protocol definition file to a test and measurement instrument.

Example 10 is the one or more computer-readable storage media of example 9, wherein the instructions further cause the protocol designer to generate event and field matches with timing information in the signal based on the protocol definitions.

Example 11 is the one or more computer-readable storage media of either one of examples 9 and 10, in which the signal is an analog signal and wherein the instructions further cause the protocol designer to generate a bitstream based on the analog signal and one or more of the protocol definitions.

Example 12 is the one or more computer-readable storage media of any one of examples 9-11, in wherein the instructions further cause the protocol designer to halt decoding of the signal when an event is detected.

Example 13 is the one or more computer-readable storage media of any one of examples 9-12, wherein the instructions further cause the protocol designer to decode the input signal based on the protocol definitions and search for a particular event within the decoded input signal.

Example 14 is the one or more computer-readable storage media of any one of examples 9-13, wherein the instructions further cause the protocol designer to display at least a portion of the event packets and the input signal concurrently.

Example 15 is the one or more computer-readable storage media of example 14, wherein the instructions further cause the protocol designer to display the at least a portion of event packets overlaid on the input signal.

Example 16 is the one or more computer-readable storage media of any one of examples 9-15, wherein the instructions further cause the protocol designer to identify and highlight syntax errors within the protocol definitions.

Example 17 is a method for generating, debugging, and deploying protocol definitions for a test and measurement instrument, comprising: receiving an analog signal; storing the analog signal; generating protocol definitions based on a user input; outputting textual and visual decode results based on the protocol definitions and the analog signal; generating a compiled protocol definition filed based on the user input; and deploying the complied protocol definition file to a test and measurement instrument.

Example 18 is the method of example 17, wherein outputting textual and visual decode results further includes generating event and field matches with timing information in the signal based on the protocol definitions.

Example 19 is the method of either one of examples 17 or 18, wherein outputting textual and visual decode results further includes generating a bitstream based on the analog signal and one or more of the protocol definitions.

Example 20 is the method of any one of examples 17-19, further comprising displaying at least a portion of the event packets and the input signal concurrently.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A protocol designer for a test and measurement instrument, comprising:
    an input to receive an analog signal;
    a memory configured to store the analog signal;
    a user interface structured to display information in one or more windows;
    an author configured to generate protocol definitions as source code based on a user input;
    a debugger configured to generate a bitstream based on the analog signal and one or more of the protocol definitions, to compile the source code of the protocol definitions, and output textual and visual decode results of any errors in the source code to the one or more windows of the user interface based on the protocol definitions, the visual decode results showing the analog signal and any errors in application of the protocol definitions to the analog signal; and
    a deployer configured to output a compiled protocol definition file resulting from compiling the source code to the test and measurement instrument.

2. The protocol designer of claim 1, in which the debugger is further configured to generate event and field matches with timing information in the signal based on the protocol definitions.

3. The protocol designer of claim 1, in which the debugger is further configured to halt decoding of the analog signal when an event is detected.

4. The protocol designer of claim 1, in which the debugger is further configured to decode the analog signal based on the protocol definitions and search for a particular event within the decoded analog signal.

5. The protocol designer of claim 1, in which the debugger outputs event packets based on the protocol definitions and the analog signal concurrently.

6. The protocol designer of claim 5, in which the user interface is further configured to display the at least a portion of event packets overlaid on the analog signal.

7. The protocol designer of claim 1, in which the debugger is further configured to identify and highlight syntax errors within the protocol definitions.

8. One or more non-transitory computer-readable storage media comprising instructions, which, when executed by one or more processors of a protocol designer, cause the protocol designer to:
    receive an analog signal;
    store the analog signal;
    generate protocol definitions as source code based on a user input;
    generate a bitstream based on the analog signal and one or more of the protocol definitions;
    output to a single user interface textual and visual decode results based on the protocol definitions and application of the protocol definitions to the analog signal, the visual decode results showing the analog signal and any errors in application of the protocol definitions to the analog signal;
    generate a compiled protocol definition file by compiling the source code based on the user input; and
    output the compiled protocol definition file to a test and measurement instrument.

9. The one or more non-transitory computer-readable storage media of claim 8, wherein the instructions further cause the protocol designer to generate event and field matches with timing information in the signal based on the protocol definitions.

10. The one or more non-transitory computer-readable storage media of claim 8, in wherein the instructions further cause the protocol designer to halt decoding of the analog signal when an event is detected.

11. The one or more non-transitory computer-readable storage media of claim 8, wherein the instructions further cause the protocol designer to decode the analog signal based on the protocol definitions and search for a particular event within the decoded analog signal.

12. The one or more non-transitory computer-readable storage media of claim 8, wherein the instructions further cause the protocol designer to display at least a portion of the event packets and the analog signal concurrently.

13. The one or more non-transitory computer-readable storage media of claim 12, wherein the instructions further cause the protocol designer to display the at least a portion of event packets overlaid on the analog signal.

14. The one or more non-transitory computer-readable storage media of claim 8, wherein the instructions further cause the protocol designer to identify and highlight syntax errors within the protocol definitions.

15. A method for generating, debugging, and deploying protocol definitions for a test and measurement instrument, comprising:
    receiving an analog signal;
    storing the analog signal;
    generating protocol definitions as source code based on a user input;
    generating a bitstream based on the analog signal and one or more of the protocol definitions;
    outputting to a single user interface textual and visual decode results based on the protocol definitions source code and application of the protocol definitions to the analog signal, the visual decode results showing the analog signal and any errors in application of the protocol definitions to the analog signal;

generating a compiled protocol definition file by compiling the source code based on the user input; and deploying the compiled protocol definition file to a test and measurement instrument.

16. The method of claim 15, wherein outputting textual and visual decode results further includes generating event and field matches with timing information in the analog signal based on the protocol definitions.

17. The method of claim 15, further comprising displaying at least a portion of the event packets and the analog signal concurrently.

* * * * *